United States Patent
Kruglick

(10) Patent No.: US 9,147,205 B2
(45) Date of Patent: Sep. 29, 2015

(54) REACTIVE TAGS FOR OBTAINING CONSUMER SURVEY RESPONSES

(75) Inventor: Ezekiel Kruglick, Poway, CA (US)

(73) Assignee: Empire Technology Development, LLC, Wilmington, DE (US)

( * ) Notice: Subject to any disclaimer, the term of this patent is extended or adjusted under 35 U.S.C. 154(b) by 116 days.

(21) Appl. No.: 13/811,643

(22) PCT Filed: Jun. 5, 2012

(86) PCT No.: PCT/US2012/040852
§ 371 (c)(1),
(2), (4) Date: Jan. 22, 2013

(87) PCT Pub. No.: WO2013/184097
PCT Pub. Date: Dec. 12, 2013

(65) Prior Publication Data
US 2013/0320086 A1    Dec. 5, 2013

(51) Int. Cl.
*G06K 7/00* (2006.01)
*G06Q 30/02* (2012.01)
*G06K 19/06* (2006.01)
*G06K 19/02* (2006.01)
*G06K 19/067* (2006.01)

(52) U.S. Cl.
CPC .............. *G06Q 30/0282* (2013.01); *G06K 7/00* (2013.01); *G06K 19/02* (2013.01); *G06K 19/067* (2013.01); *G06K 19/06009* (2013.01); *G06K 19/06196* (2013.01)

(58) Field of Classification Search
USPC ........................................................ 235/435
See application file for complete search history.

(56) References Cited

U.S. PATENT DOCUMENTS

| | | | |
|---|---|---|---|
| 7,286,055 B2 | 10/2007 | Girvin et al. | |
| 7,391,323 B2 * | 6/2008 | Hoshina | ..................... 340/572.1 |
| 7,839,285 B2 | 11/2010 | Tuttle | |
| 2006/0111962 A1 | 5/2006 | Holsinger | |
| 2007/0119950 A1 * | 5/2007 | Auslander et al. | ............ 235/486 |

(Continued)

FOREIGN PATENT DOCUMENTS

| | | |
|---|---|---|
| EP | 2060997 A1 | 5/2009 |
| JP | 2000033952 A | 2/2000 |

OTHER PUBLICATIONS

International Search Report and Written Opinion for PCT/US 12/40852, filed Jun. 5, 2012, mailed on Aug. 22, 2012.
"QR code" accessed at https://web.archive.org/web/20120604120206/http://en.wikipedia.org/wiki/QR_Code, last modified on Jun. 2, 2012, pp. 19

(Continued)

*Primary Examiner* — Michael G Lee
*Assistant Examiner* — David Tardif
(74) *Attorney, Agent, or Firm* — Turk IP Law, LLC

(57) ABSTRACT

Technologies are generally described for obtaining consumer survey responses encoded on a reactive tag associated with an item. Prior to distributing a product to consumers, a manufacturer may affix a reactive tag to the item for gathering consumer feedback about the product. Consumer survey questions and responses may be encoded on the reactive tag, and the consumer may be able to remove a portion of the tag in order to select a consumer survey response. The reactive tag may be configured to react to the removal of a portion of the reactive tag by encoding data on the reactive tag for the consumer response and/or changing a physico-chemical state of the reactive tag for storing the consumer survey responses. When the consumer has finished with the product, the product may be received at a recycling facility, where a machine may scan the reactive tag to retrieve consumer survey responses.

20 Claims, 10 Drawing Sheets

(56) References Cited

U.S. PATENT DOCUMENTS

| | | | |
|---|---|---|---|
| 2008/0011822 A1 | 1/2008 | Ackley et al. | |
| 2010/0156642 A1 | 6/2010 | Lindsay et al. | |
| 2010/0206949 A1* | 8/2010 | Mattlin et al. | 235/375 |
| 2011/0182805 A1 | 7/2011 | Desimone et al. | |
| 2012/0135527 A1* | 5/2012 | Bangera et al. | 436/3 |
| 2012/0173440 A1* | 7/2012 | Dehlinger et al. | 705/308 |

OTHER PUBLICATIONS

"Survey Cost Comparisons," accessed at http://web.archive.org/web/20111227030129/http://www.contactcenterpro.com/survey_cost_comparisons.htm, accessed on Oct. 13, 2014, pp. 3.

International Preliminary Report on Patentability for PCT/US2012/040852 filed Jun. 5, 2012, mailed on Dec. 18, 2014, issued Dec. 9, 2014.

\* cited by examiner

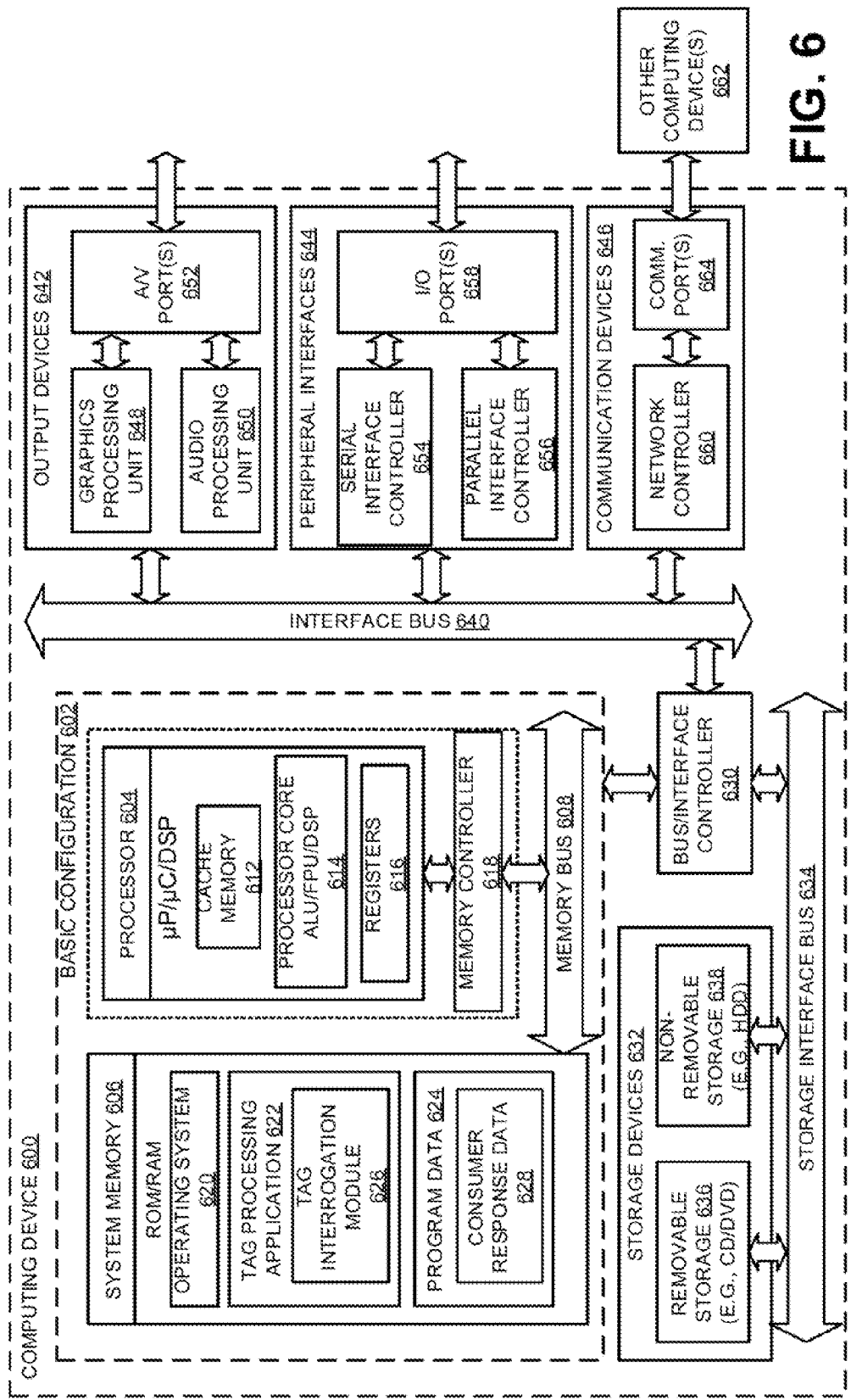

COMPUTER PROGRAM PRODUCT 800

SIGNAL-BEARING MEDIUM 802

804 AT LEAST ONE OF

ONE OR MORE INSTRUCTIONS FOR ENCODING CONSUMER SURVEY RESPONSES ON A TAG;
ONE OR MORE INSTRUCTIONS FOR AFFIXING THE TAG TO AN ITEM;
ONE OR MORE INSTRUCTIONS FOR ENABLING A CONSUMER TO REMOVE A PORTION OF THE TAG TO SELECT A CONSUMER SURVEY RESPONSE ;
ONE OR MORE INSTRUCTIONS FOR RECEIVING THE ITEM AT A RECYCLING FACILITY; AND
ONE OR MORE INSTRUCTIONS SCANNING THE TAG TO RETRIEVE CONSUMER SURVEY RESPONSES.

| COMPUTER-READABLE MEDIUM 806 | RECORDABLE MEDIUM 808 | COMMUNICATIONS MEDIUM 810 |

REACTIVE TAGS FOR OBTAINING CONSUMER SURVEY RESPONSES

This Application is the National Stage filing under 35 U.S.C. 371 of PCT Application Ser. No. PCT/US12/40852 filed on Jun. 5, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

Manufacturers and sellers of products are often interested in receiving feedback from a consumer about the consumer's satisfaction, ratings, and overall opinion of a product. Manufacturers often create consumer surveys which may be distributed via paper mail, email, internet, and telephone, and the manufacturers may spend a lot of time, energy, and resources generating the consumer surveys and attempting to distribute the surveys and collect the consumer survey responses. Often times consumers do not respond to the consumer surveys and it can be difficult for manufacturers to retrieve valuable feedback from consumers. Frequently, consumers may discard the product and/or the product packaging at waste and recycling facilities when they have finished with the product. Recycling facilities may generate summary recycling reports about received items for providing information about materials and items received at the facility, and may have the capabilities of utilizing machines to scan received products to retrieve encoded information about the product.

SUMMARY

The present disclosure generally describes technologies for obtaining consumer information through machine-reading reactive tags affixed to items. According to some examples, the present disclosure describes a method for obtaining consumer information through a reactive tag. The method may include encoding one or more consumer survey responses onto the reactive tag such that the consumer survey responses are selectable through a manual action and readable through a machine action, where the reactive tag is configured to react by: changing a physico-chemical state of the reactive tag, modifying data encoded on the reactive tag, or encoding data on the reactive tag responsive to the manual action. The method may also include affixing the reactive tag to an item provided to a consumer such that the consumer survey responses are retrieved from the reactive tag through the machine action upon receiving the item from the consumer.

According to other examples, the present disclosure describes a method for obtaining consumer information through a reactive tag. The method may include upon receiving an item to which the reactive tag is affixed, retrieving one or more consumer survey responses associated with the item from the reactive tag through a machine action, wherein the one or more consumer survey responses are encoded onto the reactive tag such that the responses are selectable through a manual action and the reactive tag is configured to react by: changing a physico-chemical state of the reactive tag, modifying data encoded on the reactive tag, or encoding data on the reactive tag responsive to the manual action.

According to some other examples, the present disclosure describes a Radio Frequency Identification (RFID) tag affixed on an item for obtaining consumer information associated with the item. The RFID tag may include a substrate; an antenna; an integrated circuit (IC); and circuitry external to the integrated circuit, the circuitry configured to store consumer survey responses by encoding data.

According to further examples, the present disclosure describes a reactive tag affixed on an item for obtaining consumer information associated with the item. The reactive tag may include a spectroscopically reactive tag comprising a substrate and a spectral label selectable through the manual action, where the spectral label reacts by generating a modified signal in response to a spectroscopic probe signal; or a manually triggered tag comprising a substrate, a trigger selectable through the manual action, and a reactive label, wherein the reactive label independently changes a physico-chemical state responsive to the selected trigger.

According to yet other examples, the present disclosure describes a system for obtaining consumer information through a reactive tag. The system may include a tag interrogation module configured to obtain one or more consumer survey responses from an item, where the one or more consumer survey responses are encoded onto the reactive tag affixed to the item such that the responses are selectable through a manual action and the reactive tag is configured to react by: changing a physico-chemical state of the reactive tag, modifying data encoded on the reactive tag, or encoding data on the reactive tag responsive to the manual action. The system may also include a processing module configured to: collect retrieved responses from a plurality of items; generate a report based on the collected responses; and provide the report to a manufacturer or an evaluator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 illustrates a general purpose computing device, which may be used to obtain consumer survey responses associated with an item;

FIG. 8 illustrates a block diagram of an example computer program product, all arranged in accordance with at least some embodiments described herein.

DETAILED DESCRIPTION

Figure 1:
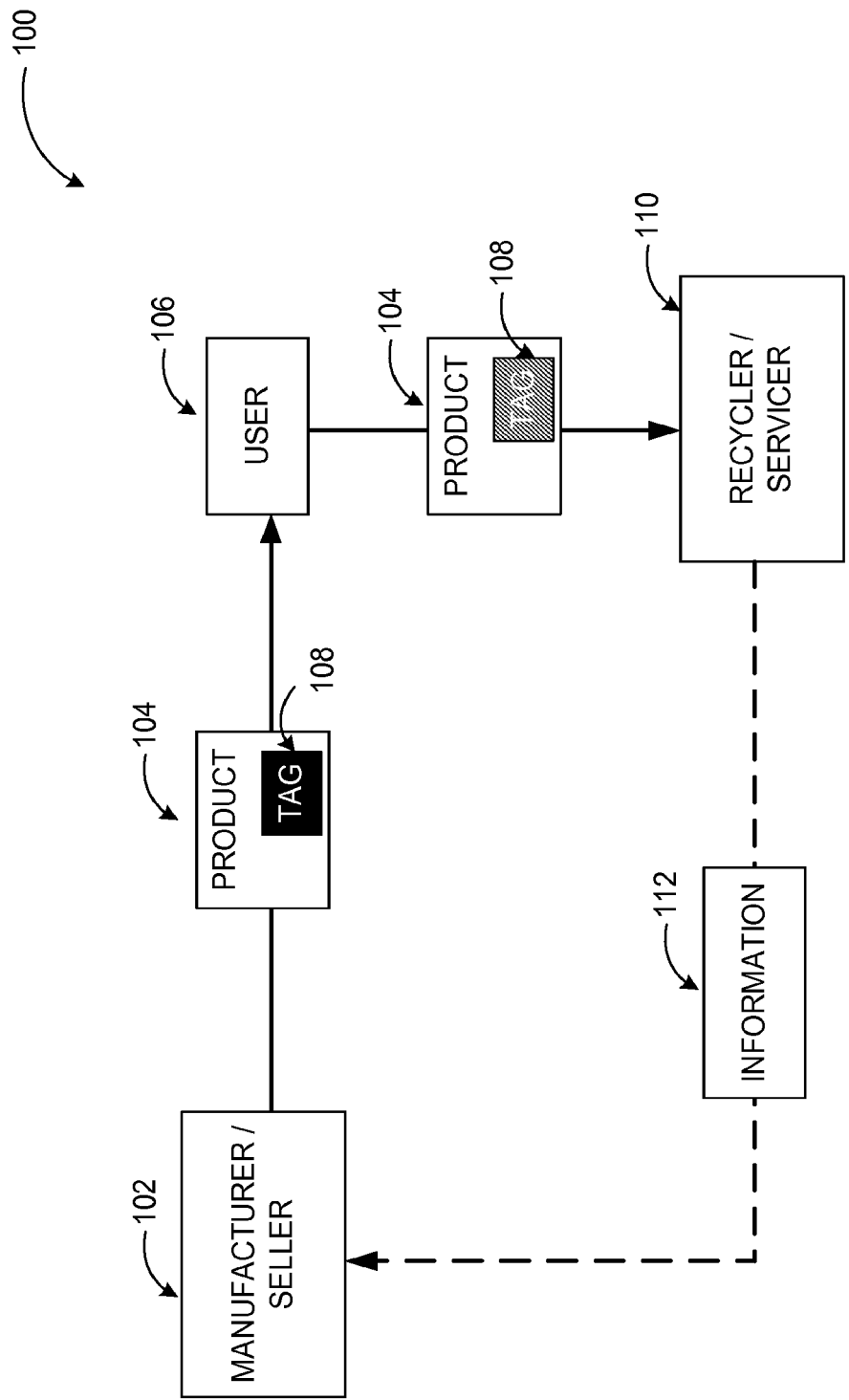
FIG. 1 illustrates an example system, where a reactive tag affixed to a product may be used to obtain consumer survey responses associated with the product.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to obtaining consumer survey responses associated with an item.

Briefly stated, technologies are generally provided for obtaining consumer survey responses encoded on a reactive tag associated with an item. Prior to distributing a product to consumers, a manufacturer may affix a reactive tag to the item for gathering consumer feedback about the product. Consumer survey questions and responses may be encoded on the reactive tag, and the consumer may be able to remove a portion of the tag in order to select a consumer survey response. The reactive tag may be configured to react to the removal of a portion of the reactive tag by encoding data on the reactive tag for the consumer response and/or changing a physico-chemical state of the reactive tag for storing the consumer survey responses. When the consumer has finished with the product, the product may be received at a recycling facility, where a machine may scan the reactive tag to retrieve consumer survey responses As used herein, a "reactive tag" is a tag that is configured to encode data readable through a machine action, where the data may be encoded or modified in reaction to a manual action. The encoding or modification of encoded data may be associated with a change of a mechanical, an electrical, or a physico-chemical state of the reactive tag. For example, a machine action may include sending an RF interrogation signal to an RFID tag. The RF interrogation signal may power the RFID tag, and the RFID tag may return a modified RF signal that includes the encoded or modified data. In another example, the machine action may include sending a spectroscopic probe signal, for example light at an excitation wavelength, to a reactive tag that includes a spectral label, for example, a fluorophore. The fluorophore may react by absorbing a photon at the excitation wavelength, which promotes an electron to an excited state in the fluorophore. The fluorophore's excited state may then decay and generate a modified signal as a photon of a corresponding fluorescence emission wavelength. In another example, the manual action may include triggering the release of a reactive material from a reservoir. For example, a user may press a self-puncturing blister that includes two reactive reagents, that when mixed, may undergo a change in physico-chemical state such as a colorimetric chemical reaction. As such a "reactive tag" is distinguished from optically readable labels, for example, where information may be recorded through writing, printing, or similar actions and obtained through human or machine reading.

As used herein, an "item", to which a reactive tag is affixed, may be any commercial or non-commercial goods. A non-exhaustive, example list of items—for which consumer survey responses are sought—may include electronic products (televisions, computers, audio equipment, mobile devices, etc.), appliances (refrigerators, automated kitchen equipment, microwave ovens, mixers, etc.), mechanical products (exercise equipment, tools, etc.), furniture, books, decorative items, and comparable ones. An "item" may also include packaging for consumer goods. For example, boxes or bags of perishable goods, pharmaceuticals, above-listed example products, and similar ones may also be affixed with a reactive tag to retrieve consumer survey responses, which may be encoded through manual action and retrieved through machine action.

FIG. 1 illustrates an example system, where a reactive tag affixed to a product may be used to obtain consumer survey responses associated with the product, arranged in accordance with at least some embodiments described herein. Manufacturers and sellers are often interested in receiving feedback from a consumer about the consumer's satisfaction, ratings, and overall opinion of a product. The manufacturers and sellers typically may spend a lot of time, energy, and resources generating consumer surveys and attempting to distribute the surveys and collect the consumer survey responses via paper mail, email, the internet and telephone. Typically, after a consumer has purchased and used a product, when the consumer is finished with the product, the consumer may discard the product and/or the product packaging at waste and recycling facilities. An example embodiment may combine the consumer survey process with the product discarding and recycling process in order to efficiently retrieve consumer feedback while appropriately and economically discarding and recycling product waste.

A manufacturer 102 or seller of a product 104 may take advantage of a consumer's 106 discarding of the product 104 and/or product waste in order to retrieve valued consumer information and survey responses after the consumer 106 has used the product 104. Before distributing the product 104 to the consumer 106, the manufacturer 102 may affix a reactive tag 108 to the product 108 for providing a consumer survey and retrieving consumer responses to the consumer survey. The reactive tag 108 may be an RFID tag, for example, and the reactive tag 108 may be configured to enable the manufacturer 102 to encode consumer survey information onto the reactive tag 108.

In an example embodiment, when the consumer 106 receives the product, the consumer 106 may be able to respond to the consumer survey information encoded on the reactive tag 108. Instructions may be provided with the product 104 and the reactive tag 108 for indicating how the consumer 106 may respond to questions included in the consumer survey. The consumer 106 may also provide the responses to the consumer survey information via a manual action, such as removing portions of the reactive tag 108. The reactive tag 108 may be configured to react to the consumer 106 response via manual action by encoding data on the reactive tag for the consumer response and/or changing a physico-chemical state of the reactive tag for storing the consumer survey responses. The consumer 106 responses may be retrieved from the reactive tag 108 via a machine action, such as scanning or reading the reactive tag 108. For example, an RFID reader may be used to interrogate the reactive tag 108 for retrieving the consumer survey responses from the reactive tag 108.

In an example scenario, the consumer 106 may discard the product 104 along with the reactive tag 108 including the encoded consumer survey responses to a facility for discarding used products, such as a recycling facility 110, a waste management facility, a service facility, and/or a product return facility. When the product 104 is received at one of the example waste facilities, the recycling facility 110 may scan or read the reactive tag 108 attached to the product 104 and may retrieve the consumer's responses to consumer survey information encoded on the reactive tag 108. The reactive tag 108 may also include manufacturer information and product and model data and serial numbers, so that the recycling facility 110 may accurately associate the consumer survey responses with specific manufacturers, products and item numbers.

Upon receiving the product 104, the recycling facility 110 may generate a recycling information report 112 including information about the demographics and location of the recycling facility 110, and the recycling information report 112 may also include the retrieved consumer survey responses associated with the received product 104. The recycling facility may collect retrieved consumer responses from multiple received products and may include the collected consumer survey responses in the recycling information report 112. The recycling facility 110 may provide the recycling information report along with the consumer survey responses back to the manufacturer 102 so that the manufacturer 102 may receive the valued consumer feedback for the product 104. Taking advantage of a product recycling process for retrieving consumer survey responses may enable a more efficient and cost effective method of distributing and retrieving consumer survey responses by enabling the consumer 106 to give product 104 feedback at the same time as discarding the product 104.

Figure 2:
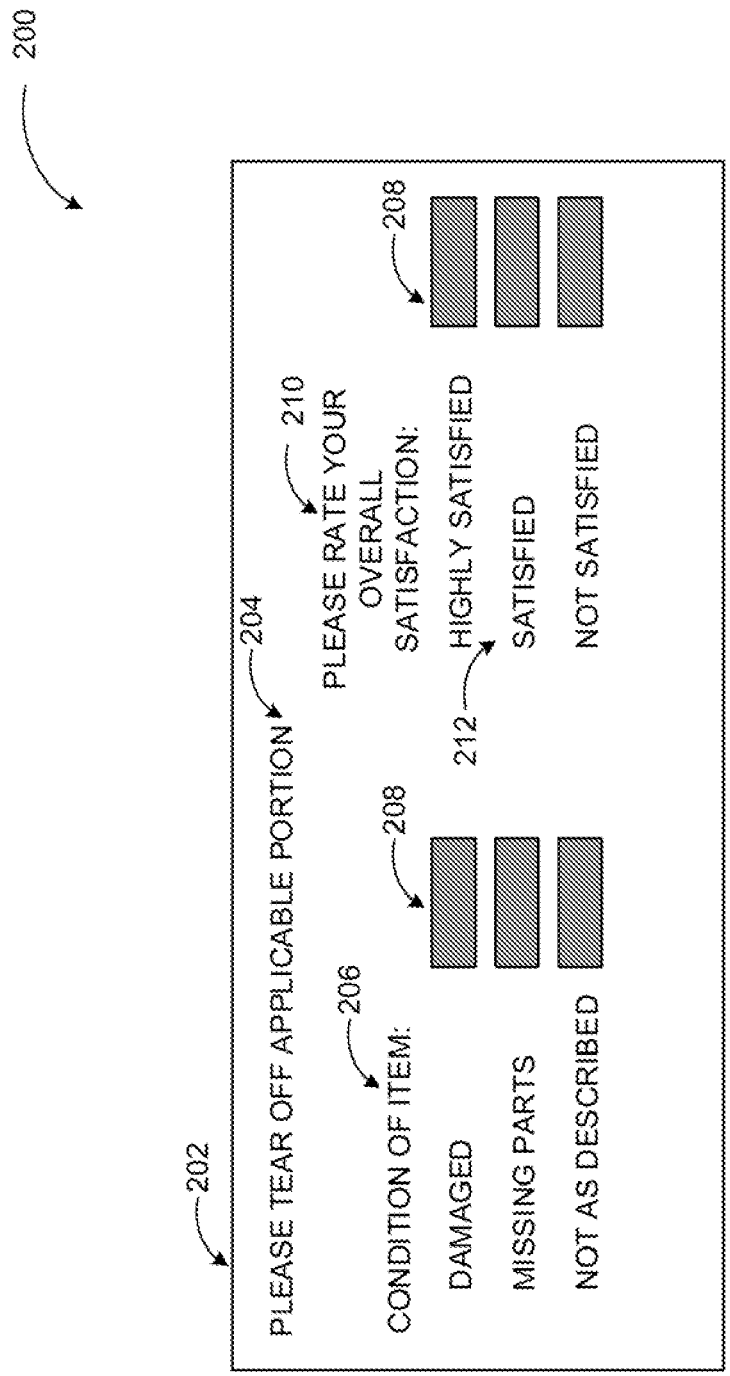
FIG. 2 illustrates a label with consumer survey questions and removable labels for indicating consumer responses through manual action, where the responses may be recorded on a reactive tag for subsequent machine-reading.

FIG. 2 illustrates a label with consumer survey questions and removable labels for indicating consumer responses through manual action, where the responses may be recorded on a reactive tag for subsequent machine-reading, arranged in accordance with at least some embodiments described herein. A manufacturer may affix a reactive tag 202 to a product before distributing the product to the consumer in order to provide consumer survey questions to a consumer for receiving consumer feedback. For example, as demonstrated in diagram 200, the manufacturer may provide questions relating to the condition 206 of the product, the consumer's overall satisfaction 210 with the product, and other information such as whether there is any product damage or missing parts. A removable label as used herein refers to a tear-off or similarly removable part of a tag, which may include printed consumer survey responses on it for selection by a consumer through removal, for example. In other examples, the potential consumer responses may be printed on the tag and the removable label may simply be a chad that can be removed by the consumer to indicate their selection of a response. In yet other examples, the removable label may refer to a portion of the tag that can be used to indicate a response selection through puncture or similar action.

In an example embodiment, the manufacturer may encode the consumer survey questions on the reactive tag 202. The reactive tag 202 may be an RFID tag, and the RFID tag may include one or more removable labels 208 corresponding to consumer responses 212. The reactive tag 202 may be configured to enable the consumer to respond to the consumer survey questions via a manual interaction with the reactive tag 202 on the product. For example, the consumer may provide a response to a consumer survey question by removing the removable label 208 corresponding to a selected response. The removal of the removable label may indicate the consumer response to one of the consumer survey questions encoded on the reactive tag 202. The reactive tag 202 may react to removal of the label by modifying the data encoded on the reactive tag 202, encoding new data on the reactive tag, and/or changing a physico-chemical state of the reactive tag 202 in order to store and indicate the consumer's response. A machine, such as an RFID tag interrogator, may be configured to read the reactive tag 202 to retrieve the consumer survey response.

The reactive tag 202 may also include a set of instructions 204 encoded on the reactive tag 202 for instructing the consumer with how to respond to consumer survey questions encoded on the reactive tag 202. The instructions 204 and the consumer survey questions may be provided on the reactive tag 202 via multiple encoding methods. For example, the instructions and questions may be printed on the reactive tag 202 using one or more of: inkjet printing, gravure printing, flexographic printing, thermal printing, laser printing, or roll-to-roll fabrication.

In another embodiment, a two dimensional matrix code, such as a quick response code, may be encoded in a series of dots on the reactive tag. Each dot of the two dimensional matrix code may be a removable label corresponding to consumer survey responses. The provided instructions 204 may inform the consumer which dots of the two dimensional matrix code to remove to select a consumer survey response, and the consumer may provide a consumer survey response by removing one or more of the dots of the two dimensional matrix code corresponding to the selected consumer survey response.

Figure 3A:
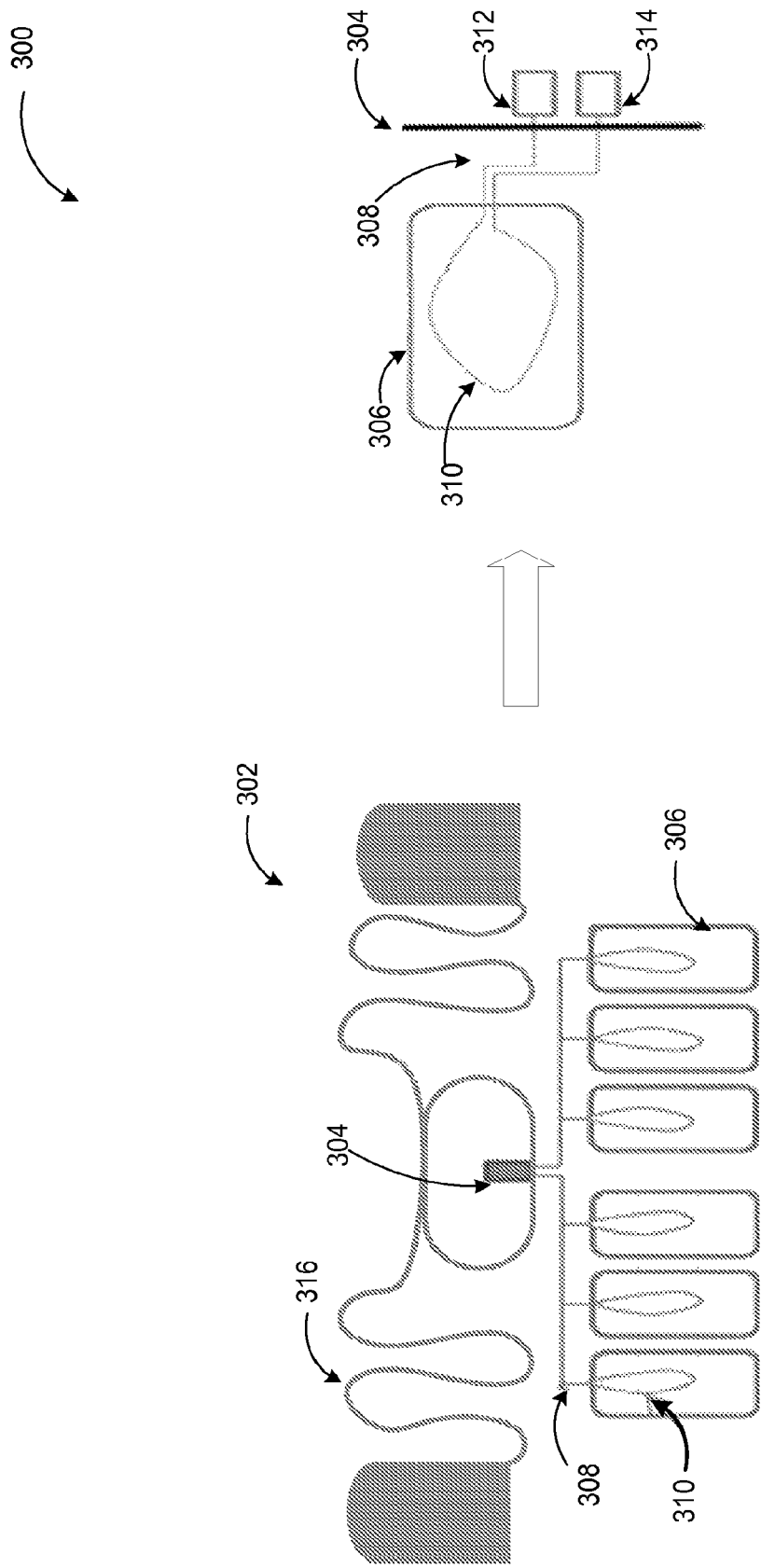
FIG. 3A illustrates an example RFID tag and memory structure that may be used to obtain consumer survey responses associated with an item.

FIG. 3A illustrates an example RFID tag and memory structure that may be used to obtain consumer survey responses associated with an item, according to at least some embodiments as described herein. As previously discussed the reactive tag for providing consumer survey questions and responses may be an RFID tag 302, which may be a passive or an active tag. The RFID tag 302 may include a substrate, an integrated circuit 304 for storing encoded information such as manufacturer codes, recycling codes, and serial numbers, and an antenna 316 for communication with an external machine such as a reader or interrogator. The substrate may be a paper, plastic or other recyclable material, and the RFID tag 302 may include one or more removable labels 306 corresponding to consumer responses which may be attached to the substrate. The reactive tag 302 may be configured to enable the consumer to respond to the consumer survey questions by removing the removable label 306 corresponding to a selected response, and the removal of the removable label 306 may indicate the consumer response to one of the consumer survey questions encoded on the reactive tag 302.

In an example embodiment the RFID tag 302 may include a wired circuitry 308 which may be external to the integrated circuit 304 for storing selected consumer survey responses. The wired circuitry 308 may be configured for encoding the consumer survey responses within the integrated circuit 304 so that a machine, such as a reader, may read the RFID tag 302 to retrieve the consumer survey response and other encoded information. The wired circuitry 308 may also be connected to the integrated circuit 304 for indicating the consumer survey response upon removal of one of the removable labels 306.

In an example embodiment, the wired circuitry 308 may include extension wiring 310, which may be attached to each removable label 306. Each removable label 306 and its attached extension wiring 310 may be connected to the integrated circuit 304 and may include a memory pad 312 for storing one or more memory bits associated with the removable label corresponding to a consumer survey response. Each removable label 306 and attached extension wiring 310 may also include a second pad 314 which may provide a power supply, such as a Vdd power supply.

In a system according to embodiments, the consumer may remove the removable label 306 to select a consumer survey response. Upon removing the removable label 306, the extension wiring 310 may be broken and disconnected from the wired circuitry 308 attached to the integrated circuit 304. The disconnection of the extension wiring 310 from the wired circuitry 308 may set the one or more memory bits associated with the memory pad 312 which may encode the consumer response on the integrated circuit 304. The memory bits may be set when the extension wiring 310 is broken and disconnected from the power supply associated with the second pad 314 resulting in changing the memory bit setting from one to zero. For example, while the extension wiring 310 remains connected to the integrated circuit 304 via the wired circuitry 308, the memory bit on the memory pad 312 corresponding to a particular removable label may be set to one. Upon disconnection due to breaking of the extension wiring 310 from the wired circuitry 308, the memory bit on the memory pad 312 corresponding to a particular removable label and selected consumer response may be set to zero. The change in the memory bit setting from one to zero may indicate that the user has selected the response corresponding to that memory bit. When the machine reader interrogates the RFID tag 302, each set memory bit, and also combinations of set memory bits, may indicate the encoded consumer survey responses.

Figure 3B:
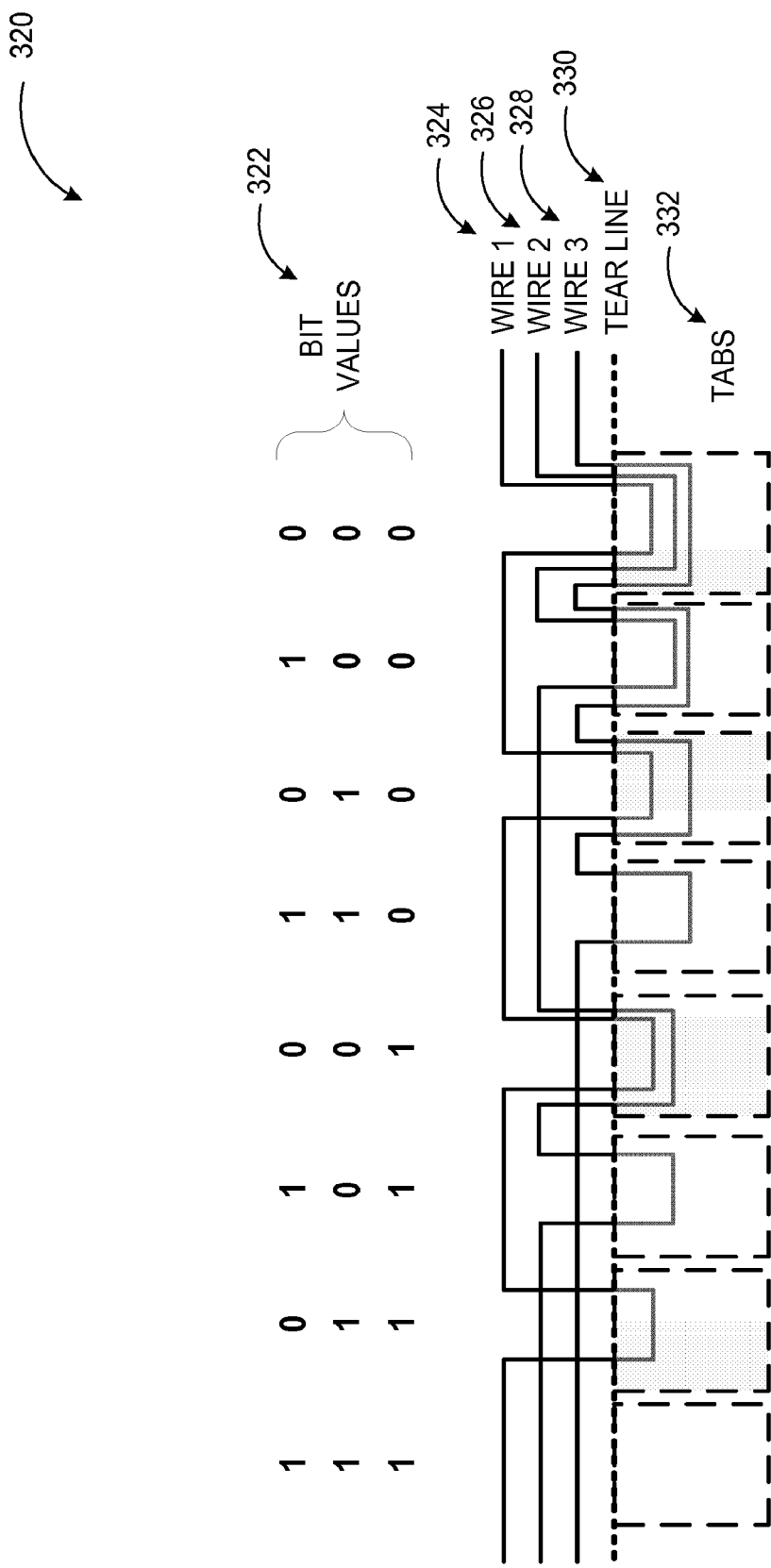
FIG. 3B illustrates another example wired-memory structure that may be used in conjunction with an RFID tag to encode multi-bit responses.

FIG. 3B illustrates another example wired-memory structure that may be used in conjunction with an RFID tag to encode multi-bit responses, arranged in accordance with at least some embodiments described herein.

Diagram 320 shows how eight tear-off labels 332 may represent three bits of data each implemented by three wires. The binary representation is depicted at the top as bit values 322 (read downward) and the wiring is shown below as wires 1, 2, and 3 (324, 326, and 328). The illustrated configuration employs fewer wires than the number of tear-off tabs or labels ((2^n)–1 tabs available for n wires). In the example configuration, the wiring would need crossover capabilities. Alternatively, one wire per label, or any mix of the two techniques may be used. Some labels in the binary scheme may also be left out for error checking to catch if multiple labels are ripped off along the tear-off line 330.

Figure 4:
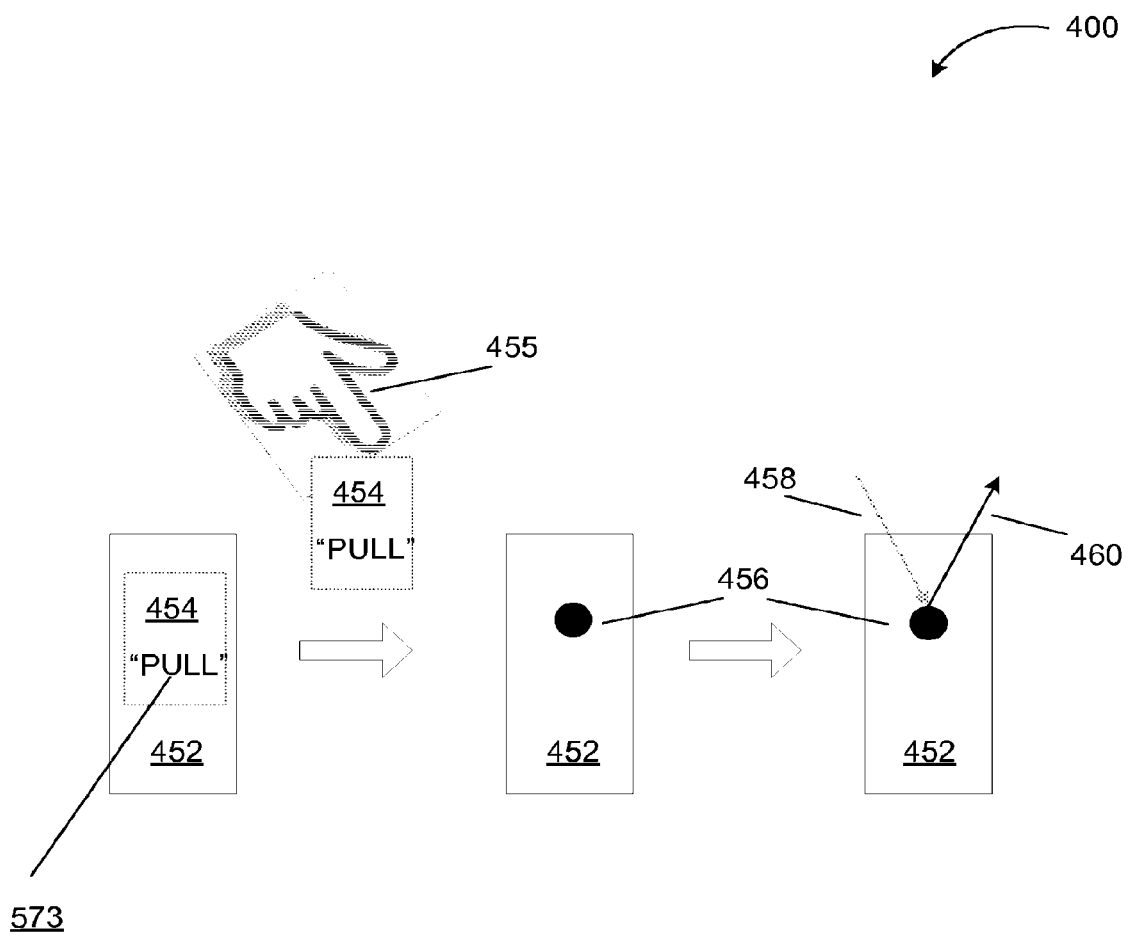
FIG. 4 illustrates use of a spectroscopically reactive tag that includes a substrate and a spectral label selectable through manual action for obtaining consumer survey responses associated with an item.

FIG. 4 illustrates use of a spectroscopically reactive tag 400 that includes a substrate and a spectral label selectable through manual action for obtaining consumer survey responses associated with an item, arranged in accordance with at least some embodiments described herein. Spectroscopically reactive tag 400 includes a substrate 452, a manually operable element such as sticker 454, and a spectral label 456. To activate spectroscopically reactive tag 400, a consumer employs a manual action 455 to select spectral label 456. The manual action may cause the spectral label to be responsive to the spectroscopic probe signal through one or more actions of revealing, obscuring, moving, removing, or destroying, e.g., as applied to a sticker such as 454. For example, a consumer may remove sticker 454 from substrate 452 to reveal spectral label 456 as directed by a label instruction 453 to "PULL." Subsequently, when the spectral label is read by machine, a spectral probe 458 is directed to spectral label 456. For example, spectral label 456 may include a fluorophore. Spectral probe 458 may be light in an excitation wavelength corresponding to the fluorophore at spectral label 456. The fluorophore may absorb spectral probe 458 and return a modified signal 460, e.g., a corresponding fluorescence emission wavelength.

Figure 5A:
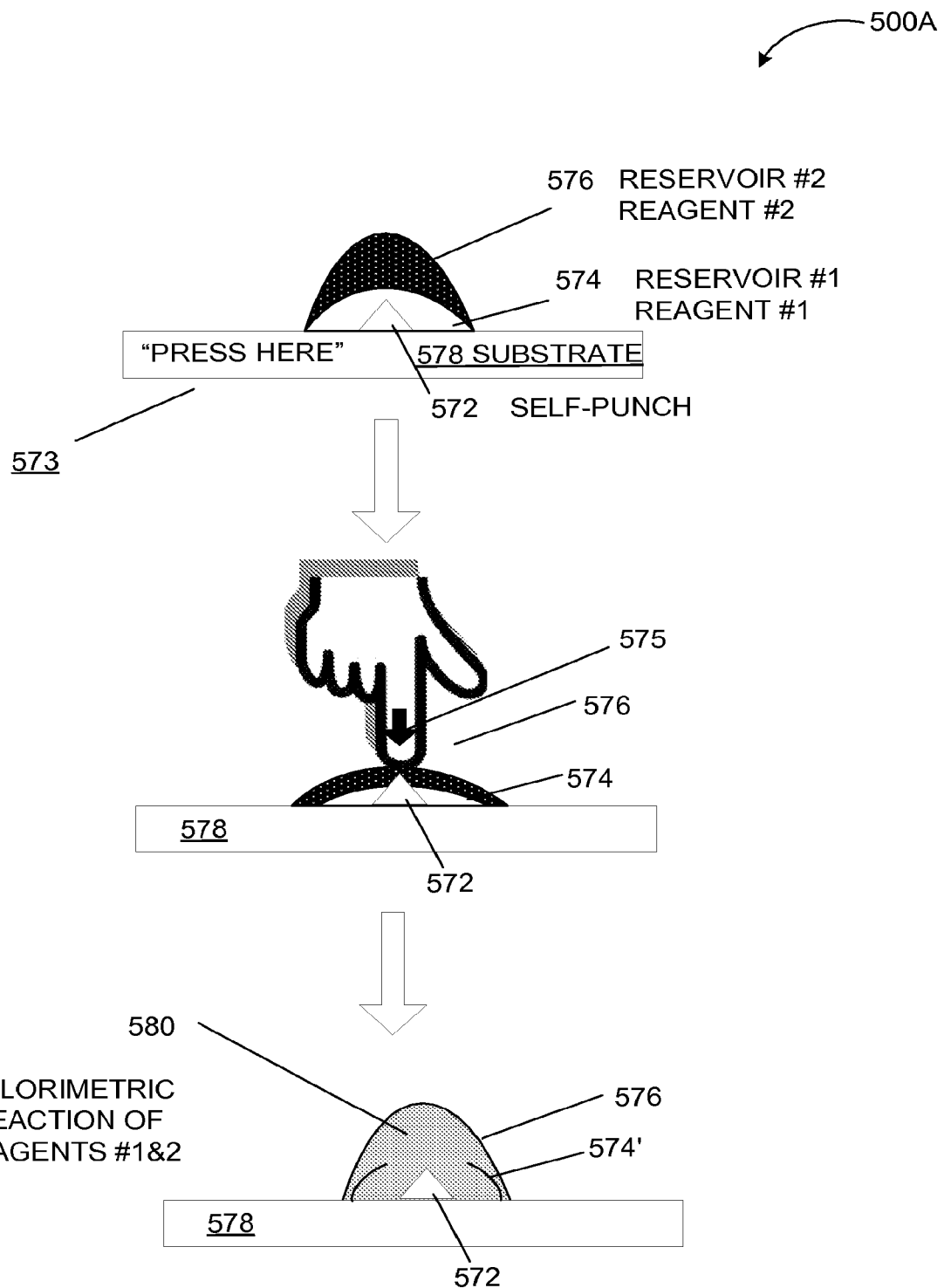
FIG. 5A illustrates use of an example chemically reactive tag that independently changes its physico-chemical state, e.g., color, through manual action for obtaining consumer survey responses associated with an item.

FIG. 5A illustrates use of an example chemically reactive tag 500A that independently changes its physico-chemical state, e.g., color, through manual action for obtaining consumer survey responses associated with an item, arranged in accordance with at least some embodiments described herein. Chemically reactive tag 500A includes a substrate 578, a first reservoir 574 containing a first reagent, and a second reservoir 576 containing a second reagent. Chemically reactive tag 500A also includes a trigger selectable by manual action, for example, self-punch 572 that may be activated by a manual finger press 575, for example as directed by a label instruction 573 to "PRESS HERE." The manual action causes the first reservoir 574 to be punctured, whereby reagent 1 in first reservoir 574 and reagent 2 in second reservoir 576 may mix. Reagents 1 and 2 can be any pair of reagents which lead to a detectable physico-chemical change in chemically reactive tag 500A, for example, a colorimetric reaction 580 that results in a detectable color change (e.g., a mark).

Figure 5B:
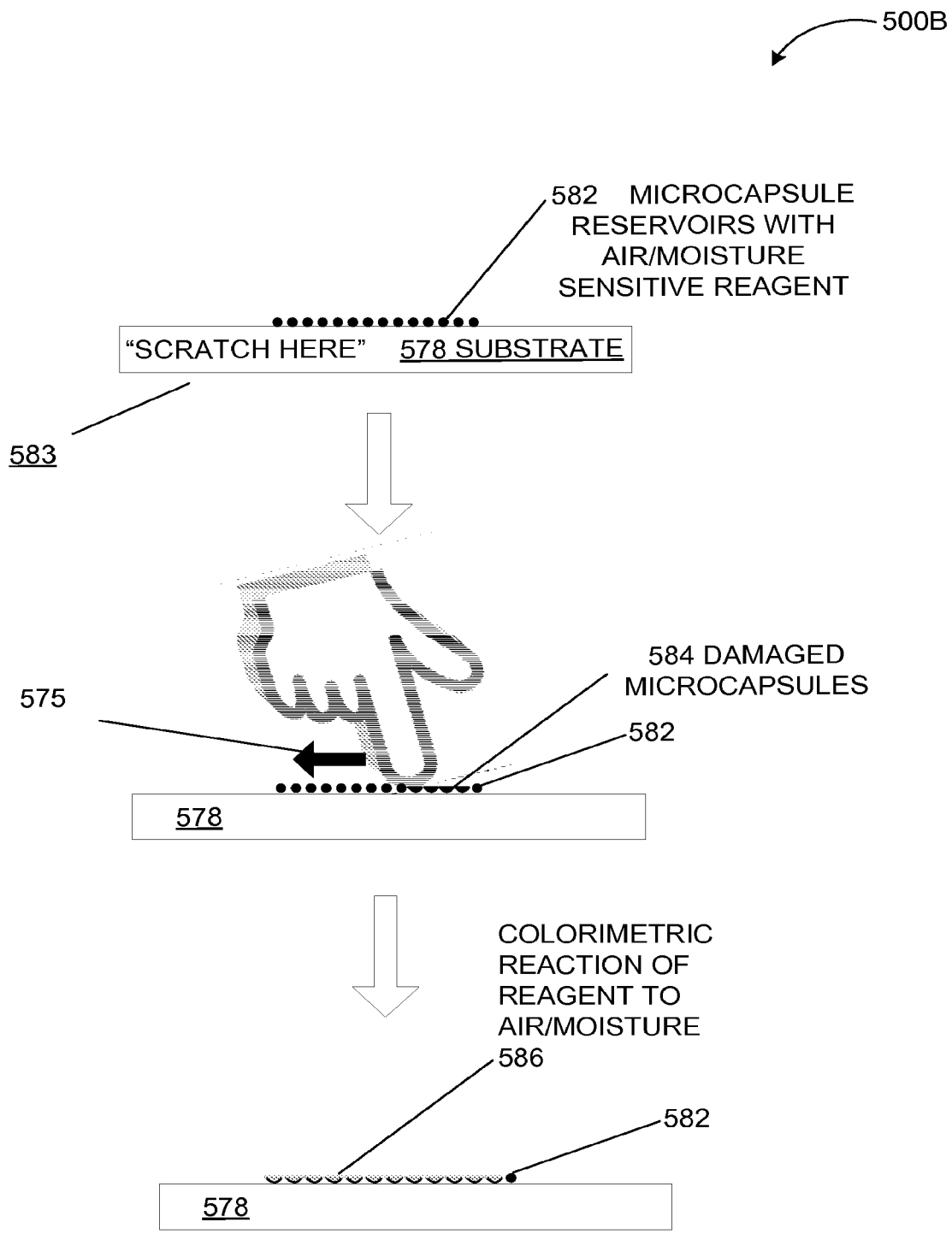
FIG. 5B illustrates use of another example chemically reactive tag that independently changes color through manual action for obtaining consumer survey responses associated with an item.

FIG. 5B illustrates use of another example chemically reactive tag 500B that independently changes color through manual action for obtaining consumer survey responses associated with an item, arranged in accordance with at least some embodiments described herein. Chemically reactive tag 500B includes a substrate 578 and a reservoir 582 containing an environmentally reactive reagent. For example, reservoir 582 may be in the form of microcapsules that are readily damaged by manual action 575, such as finger pressure or a scratching action that forms fractured microcapsules 584, for example as directed by a label instruction 583 to "SCRATCH HERE." Reservoir 582 may include a chemical reagent that reacts with the ambient environment, such as a reagent that reacts with oxygen or humidity in the atmosphere to result in a detectable physico-chemical change, e.g., a colorimetric reaction 586.

As used herein, a "trigger" is any manually selectable or operable element that causes the reactive tag to change its physico-chemical state. Suitable triggers include, for example, manually operable reservoirs such as blister packs, microcapsules, sticker-covered reservoirs, crushable or fracturable reservoirs, tearable reservoirs, puncturable reservoirs, or the like. A trigger may permit one reactive reagent or material to contact another reagent or material, the reaction of which leads to the change in the physico-chemical state. For example, the manual action may trigger a reagent in the reactive label by one or more of: exposure to oxygen, exposure to moisture, evaporation, mixing of two or more reactive components, heating, or mechanical disruption As used herein, a "physico-chemical state" in a reactive tag is any chemical or physical state or combination of chemical or physical states that may be detected by machine action. Examples of physico-chemical states include solid phase; liquid phase; gas phase; crystalline state; glassy state; amorphous state; solution phase; suspension phase; emulsion phase; state of electrical conductivity; state of magnetization; extent of optical transmission, absorbance, scattering, or reflection; state of chemical reactants, such as polymerization, cleavage, decomposition, etc; or the like. A physicochemical state may change by undergoing a transition from one physico-chemical state to another physico-chemical state. For example, changes to the physico-chemical state may occur by one or more of: evaporation; condensation; solidification; crystallization; melting or passing a glass transition temperature; dissolution; precipitation; diffusion; chemical reaction, such as polymerization of monomers; humidification; change in electrical conductivity; change in optical transmission, absorbance, scattering, or reflection, such as a colorimetric change; or the like.

As used herein, a spectroscopically reactive tag includes a spectral label material that reacts by generating a modified signal in response to a spectroscopic probe signal applied by a machine reader. Example spectral reactions of the spectral label in response to the spectral probe may include one or more of: fluorescence, phosphorescence, X-ray fluorescence, magnetization, or magnetic resonance.

For example, a spectral label may include a fluorophore, such as a small molecule organic fluorophore, a fluorescent protein, a quantum dot, or the like. The fluorophore may react to a spectral probe from the machine reader, for example, the machine reader may direct light to the spectral label that is in an excitation wavelength of the fluorophore. The fluorophore may react by absorbing a photon at the excitation wavelength, which may promote an electron to an excited state in the fluorophore. The fluorophore's excited state may then decay and generate a modified signal as a photon of a corresponding fluorescence emission wavelength. Similarly, a spectral label may include one or more elements distinguishable by X-ray fluorescence.

Suitable materials for spectral labels include one or more of: a fluorophore, a phosphor, a paramagnetic material, a magnetic material, a magneto-optical material, a quantum dot, a transition metal, or a rare earth metal.

For example, an organic fluorophore may include one or more small molecule fluorescent dyes, such as a fluorescein, a rhodamine, an eosine, a phloxine, a uranine, a succinein, a saccharein, a rosamine, a rhodol, a pyranine, an anthraquinone, a benzopyran, a thioxanthene, a perylene imide, an acridine, a cyanine, an oxazin, a coumarin, a phenanthridine, a carbopyronin, or the like. An organic fluorophore may also include fluorescent biomolecules, such as green fluorescent protein or yellow fluorescent protein. An inorganic fluorophore may include a nanoparticulate quantum dot comprising one or more of: cadmium mercury telluride, cadmium selenide, cadmium selenide/zinc sulfide, cadmium sulfide, cadmium telluride, cadmium telluride/cadmium sulfide, lead selenide, lead sulfide, copper indium sulfide, or copper indium sulfide/zinc sulfide, or the like.

Similarly, a spectral label may include one or more elements distinguishable by X-ray fluorescence. Suitable elements for X-ray fluorescence include any element which displays X-ray fluorescence, for example, transition metals or rare earth metals. Suitable metals may include, for example, Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, or combinations thereof. Spectral labels may include magnetic materials, for example, paramagnetic, magnetic, or magnetooptical materials. Such magnetic materials may include transition metals or rare earth metals, combinations thereof, inorganic compounds thereof, and organometallic compounds thereof. For example, a magnetic material may include magnetite, $Fe_2O_3$, magnetic Ni, magnetized Fe, or the like. Magnetic materials may be detected directly, e.g., by magnetization or magnetic susceptibility, or via effects on other spectral regimes, such as the rotation of polarized light by the magnetooptical Kerr effect.

FIG. 6 illustrates a general purpose computing device, which may be used to obtain consumer survey responses associated with an item, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Tag processing application 622 may include a tag interrogation module 626 that is arranged to read an RFID tag to retrieve encoded consumer survey responses. Program data 624 may include the consumer response data 628 including encoded consumer survey questions and responses, and may also include other RFID tag information related to an attached product such as manufacturer information, serial numbers a product identification numbers. This data may be retrieved via the tag interrogation module 626 and may be useful for enabling a manufacturer to review and evaluate the consumer survey responses. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Example embodiments may also include methods. These methods can be implemented in any number of ways, including the structures described herein. One such way is by machine operations of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
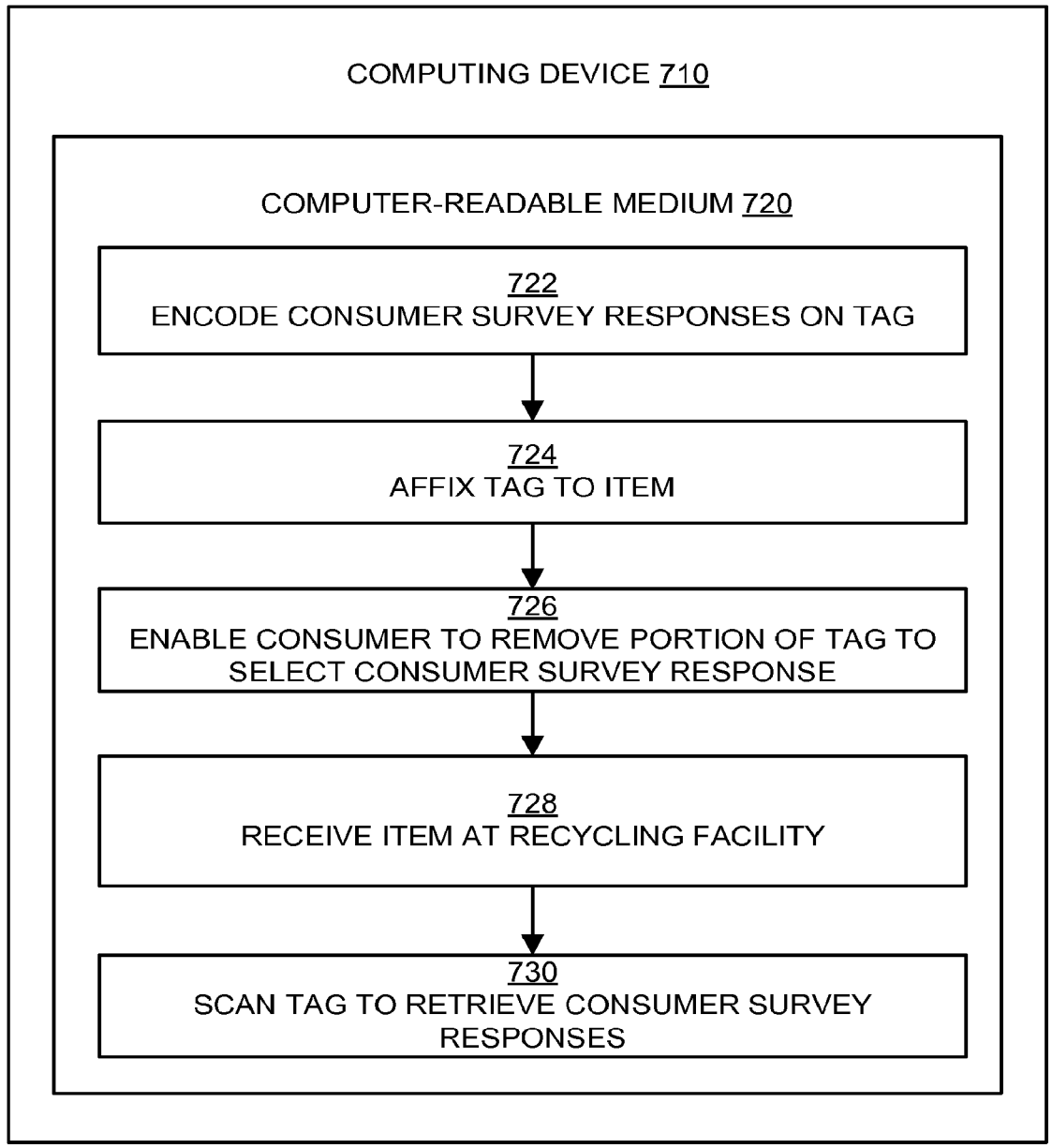
FIG. 7 is a flow diagram illustrating an example method that may be performed by a computing device such as the device in FIG. 5.

FIG. 7 is a flow diagram illustrating an example method that may be performed by a computing device such as the device in FIG. 6, arranged in accordance with at least some embodiments described herein. Example methods may include one or more operations, functions or actions as illustrated by one or more of blocks 722, 724, 726, 728 and/or 730. The operations described in blocks 722 through 730 may also be stored as computer-executable instructions in a computer-readable medium such as computer-readable medium 720 of computing device 710.

A process for obtaining consumer survey responses encoded on a reactive tag associated with an item may begin with block 722, "ENCODE CONSUMER SURVEY RESPONSES ON A TAG." At block 722, a manufacturer may encode several consumer survey questions and consumer survey response on a reactive tag. The reactive tag may be an RFID tag, and may include removable labels, which may include one or more of the consumer survey responses.

Block 722 may be followed by block 724, "AFFIX TAG TO ITEM." At block 724, the reactive tag may be affixed to a product prior to distributing the product to consumers. The reactive tag may be encoded with product identification information including manufacturer information and serial numbers. Recycling information may be encoded or included by reference, for example, if the encoding is a URL. Block 724 may be followed by block 726, "ENABLE CONSUMER TO REMOVE PORTION OF TAG TO SELECT CONSUMER SURVEY RESPONSE." At block 726, the reactive tag may also include instructions for informing a consumer how to select a consumer survey response. The consumer may select a consumer survey response by removing one or more of the removable labels from the reactive tag. Removal of the removal label from the reactive tag may disconnect a wired circuitry integrated with the reactive tag and may encode the consumer survey response in the reactive tag.

Block 726 may be followed by block 728, "RECEIVE ITEM AT RECYCLING FACILITY." At block 728, when the consumer has finished with the product and/or the product packaging, the consumer may discard the product and/or packaging along with the attached reactive tag at a recycling or comparable facility as discussed herein.

Block 728 may be followed by block 730, "SCAN TAG TO RETRIEVE CONSUMER SURVEY RESPONSES." At block 730, the recycling facility may utilize a machine to read the reactive tag and may retrieve the encoded consumer survey responses from the reactive tag. The recycling facility may retrieve additional encoded information from the reactive tag associated with the product, and may generate an information report for providing the consumer survey response information to the manufacturers.

The blocks 722 through 730 may be performed by multiple devices including a tag interrogation module 626 of a processor of a first computing device (e.g. processor 604 of the computing device 600). Of course, all blocks may be performed by a single module as well.

The blocks included in the above described process are for illustration purposes. Obtaining consumer survey responses encoded on a reactive tag associated with an item may be performed by similar processes with fewer or additional blocks. In some examples, the blocks may be performed in a different order. In some other examples, various blocks may be eliminated. In still other examples, various blocks may be divided into additional blocks, or combined together into fewer blocks.

FIG. 8 illustrates a block diagram of an example computer program product, arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 7. Thus, for example, referring to processor 604, the tag interrogation module 626 may undertake one or more of the tasks shown in FIG. 6 in response to instructions 804 conveyed to processor 604 by medium 802 to perform actions associated with obtaining consumer survey responses encoded on a reactive tag associated with an item as described herein. Some of those instructions may include encoding consumer survey responses on a tag, affixing the tag to an item, enabling a consumer to remove a portion of the tag to select a consumer survey response, receiving the item at a recycling facility, and scanning the tag to retrieve consumer survey responses.

In some implementations, signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the processor 504 by an RF signal bearing medium 802, where the signal bearing medium 802 is conveyed by a wireless communications medium 810 (e.g., a wireless communications medium conforming with the IEEE 802.11 standard).

EXAMPLES

In an example implementation, an RFID tag may include wired circuitry with extension wiring, which may be attached to one or more removable labels or chads that can be torn off from the tag. Each removable label and its attached extension wiring may be connected to the integrated circuit of the RFID tag and may include a memory pad for storing one or more memory bits associated with the removable label corresponding to a consumer survey response. Each removable label and attached extension wiring may also include a second pad which may provide supply voltage.

Instructions for responding to the consumer survey and/or the consumer survey questions may be provided on the RFID tag, for example, by printing through one or more of: inkjet printing, gravure printing, flexographic printing, thermal printing, laser printing, or roll-to-roll fabrication. In one example, the instructions may be printed on the tag and the potential survey responses may each be printed on a separate removable label.

The consumer may tear off a removable label to select a consumer survey response. Removal of the removable label may break the associated extension wiring and disconnect from the wired circuitry attached to the integrated circuit. The disconnection of the extension wiring from the wired circuitry may set (or reset) the one or more memory bits associated with the memory pad encoding the consumer response on the integrated circuit. The memory bits may be set when the extension wiring is broken and disconnected from the power supply associated with the second pad resulting in changing the memory bit setting from one to zero. For example, four bits may be associated with four potential responses to the consumer survey question "how was this product purchased." The responses (printed on the removable labels) may be "I purchased it new", "I purchased it used", "It was a gift", or "Other." By tearing off a removable label with the selected response, the user may cause the response to be encoded in the RFID tag. The response may be retrieved from the RFID tag subsequently through an RFID reader.

In another example implementation, a consumer electronic product, for example, a computer may be affixed with an RFID tag as described above. Four different consumer survey questions associated with purchase of the computer (self-new, self-used, gift, other), usage of the computer (home, work, other), reason for discarding (broken, replacement with new computer, no longer needed, other), and whether the consumer would buy the same brand again (yes, no) may be printed on the computer or on a label attached to the tag through laser printing. The consumer may select the responses by tearing off associated removable labels and thereby encoding the responses in the tag memory through breaking the extension wirings.

In a further example implementation, a chemically reactive tag may include a substrate and a reservoir containing an environmentally reactive reagent such as a small molecule fluorescent dye that independently changes color. The reservoir may be in the form of microcapsules that are readily damaged by finger pressure or a scratching action that forms fractured microcapsules. The chemical reagent may react with the ambient environment (e.g., oxygen or humidity in the atmosphere) resulting in the color change.

The chemically reactive tag may be attached to a container of pharmaceutical drugs with questions and potential responses printed on the container through gravure printing. The questions/responses may include whether the medication was prescribed by a primary care physician (yes, no), whether the container is being discarded due to completion of a drug regimen (yes, no), whether the container is being discarded due to early termination of the drug regimen (yes, no), and whether the medical condition is cured (yes, no). The consumer may select the responses by puncturing the container through finger pressure causing a color change next to the selected response, which may be read through an automated image capture device subsequently.

In yet another example implementation, a discarded computing device (e.g., the example computer discussed above) with an affixed RFID tag encoding consumer responses to printed questions, may be received at a recycling facility. As the computer is moved on a sorting band, an RFID reader may interrogate the RFID tag and retrieve the responses encoded in tag memory through the broken extension wirings. The RFID tag may also encode additional information associated with the computer such as manufacturer, manufacturing date, serial number, model, etc. A controller coupled to the RFID reader may receive the retrieved information from the RFID reader and generate a recycling information report including the retrieved consumer survey responses, computer information, information about the demographics and location of the recycling facility, etc. The recycling information report may be combined with reports for similar products such as other computers. The combined reports may be sorted according to computer types, manufacturers, demographics, and so on, and provided to manufacturers or third party evaluators for analysis.

According to some examples, the present disclosure describes a method for obtaining consumer information through a reactive tag. The method may include encoding one or more consumer survey responses onto the reactive tag such that the consumer survey responses are selectable through a manual action and readable through a machine action, where the reactive tag is configured to react by: changing a physicochemical state of the reactive tag, modifying data encoded on the reactive tag, or encoding data on the reactive tag responsive to the manual action. The method may also include affixing the reactive tag to an item provided to a consumer such that the consumer survey responses are retrieved from the reactive tag through the machine action upon receiving the item from the consumer.

The reactive tag may be a Radio Frequency Identification (RFID) tag comprising a substrate, an integrated circuit, and an antenna, and the RFID tag may be configured to provide at least a portion of data encoded on the RFID tag in response to a reader signal. The RFID tag may be a passive tag or an active tag. The substrate may comprise a paper, a plastic, mylar, or a recyclable material. The method may further include storing the consumer survey responses on the RFID tag by encoding the data onto circuitry external to the integrated circuit; enabling selection of one or more of the consumer survey responses by disconnecting a portion of the circuitry in response to the manual action; and disconnecting the portion of the circuitry by breaking extension wiring attached to one or more removable labels on the RFID tag in response to removal of the one or more removable labels as part of the manual action.

The method may also include enabling selection of one or more of the consumer survey responses by setting one or more bits in the circuitry in response to the manual action; setting the one or more bits by disconnecting a connection to a tag supply voltage or a tag ground through extension wiring attached to one or more removable labels on the RFID tag in response to removal of the one or more removable labels as part of the manual action; or setting the one or more bits to 0 or 1. Each consumer survey response may be associated with a single bit or a combination of two or more bits. The method may further include integrating the RFID tag with a label and providing a set of instructions on the label for selecting one or more of the consumer survey responses. The instructions may be provided on the label via one or more of: inkjet printing, gravure printing, flexographic printing, laser printing, or roll-to-roll fabrication. The consumer survey responses may be associated with one or more of: a condition of the item, a consumer satisfaction of the item, or an item usage.

The reactive tag may also be a spectroscopically reactive tag comprising a substrate and a spectral label selectable through the manual action, where the spectral label reacts by generating the modified signal in response to a spectroscopic probe signal. The reactive tag may further be a manually triggered reactive tag comprising a substrate, a trigger operable through the manual action, and a reactive label, where the reactive label independently changes to the physico-chemical state responsive to operation of the trigger through the manual action.

The spectral label may generate the modified signal by one or more of: fluorescence, phosphorescence, X-ray fluorescence, magnetization, or magnetic resonance. The spectral label may include one or more of: a fluorophore, a phosphor, a paramagnetic material, a magnetic material, a magneto-optical material, a quantum dot, a transition metal, or a rare earth metal. The spectral label may also include one or more of: a fluorescein, a rhodamine, an eosine, a phloxine, a uranine, a succinein, a saccharein, a rosamine, a rhodol, a pyranine, an anthraquinone, a benzopyran, a thioxanthene, a perylene imide, an acridines, a cyanines, an oxazin, a coumarin, a phenanthridines, a carbopyronin, a green fluorescent protein, or a yellow fluorescent protein. The spectral label may further include a nanoparticulate quantum dot comprising one or more of: cadmium mercury telluride, cadmium selenide, cadmium selenide/zinc sulfide, cadmium sulfide, cadmium telluride, cadmium telluride/cadmium sulfide, lead selenide, lead sulfide, copper indium sulfide, or copper indium sulfide/zinc sulfide.

The manual action may cause the spectral label to be responsive to the spectroscopic probe signal through one or more of: revealing, obscuring, moving, removing, or destroying. The reactive label may independently change to the physico-chemical state in response to the trigger by one or more of: evaporation; condensation; solidification; crystallization; melting; dissolution; precipitation; diffusion; chemical reaction; humidification; change in electrical conductivity; change in optical transmission, absorbance, scattering, or reflection. The method may further include providing a physico-chemically reactive material in at least one reservoir on the reactive label and providing a manually triggerable barrier configured to release the physico-chemically reactive material from containment by the reservoir on the reactive label. The manual action may trigger the reactive label by one or more of: exposure to oxygen, exposure to moisture, evaporation, mixing of two or more reactive components, heating, or mechanical disruption.

According to other examples, the present disclosure describes a method for obtaining consumer information through a reactive tag. The method may include upon receiving an item to which the reactive tag is affixed, retrieving one or more consumer survey responses associated with the item from the reactive tag through a machine action, wherein the one or more consumer survey responses are encoded onto the reactive tag such that the responses are selectable through a manual action and the reactive tag is configured to react by: changing a physico-chemical state of the reactive tag, modifying data encoded on the reactive tag, or encoding data on the reactive tag responsive to the manual action.

The reactive tag may be a Radio Frequency Identification (RFID) tag comprising a substrate, an integrated circuit, and an antenna, and where the RFID tag is configured to provide at least a portion of data encoded on the RFID tag in response to a reader signal. The method may further include retrieving the consumer survey responses from the RFID tag by interrogating the RFID tag with an RFID reader. The reactive tag may also be a spectroscopically reactive tag comprising a substrate and a spectral label selectable through the manual action, where the spectral label reacts by generating the modified signal in response to a spectroscopic probe signal. The reactive tag may further be a manually triggered reactive tag comprising a substrate, a trigger operable through the manual action, and a reactive label, where the reactive label independently changes to the physico-chemical state responsive to operation of the trigger through the manual action. The item may be received at a recycling facility, a waste management facility, a service facility, or a product return facility. The method may further include collecting retrieved consumer survey responses from a plurality of items; generating a report based on the collected consumer survey responses; and providing the report to a manufacturer or an evaluator.

According to some other examples, the present disclosure describes a Radio Frequency Identification (RFID) tag affixed on an item for obtaining consumer information associated with the item. The RFID tag may include a substrate; an antenna; and an integrated circuit (IC); and circuitry external to the integrated circuit, the circuitry configured to store consumer survey responses by encoding data.

The RFID tag may be configured to provide at least a portion of the data encoded on the circuitry in response to a reader signal. The RFID tag may be a passive tag or an active tag. The substrate may comprise a paper, a plastic, or a recyclable material. One or more of the consumer survey responses may be selected by disconnecting a portion of the circuitry in response to a manual action. The portion of the circuitry may be disconnected by breaking extension wiring attached to one or more removable labels on the RFID tag in response to removal of the one or more removable labels as part of the manual action. The one or more of the consumer survey responses may also be selected by setting one or more memory bits in the circuitry in response to the manual action.

The one or more memory bits may be set by disconnecting a connection to a tag supply voltage or a tag ground through extension wiring attached to one or more removable labels on the RFID tag in response to removal of the one or more removable labels as part of the manual action. The one or more memory bits may be set to 0 or 1. Each consumer survey response may be associated with: a single memory bit or a combination of two or more memory bits. The RFID tag may be integrated with a label, and a set of instructions may be provided on the label on how to provide the manual action for selecting one or more of the consumer survey responses. The instructions may be provided on the label via one or more of: inkjet printing, gravure printing, flexographic printing, laser printing, or roll-to-roll fabrication. The consumer survey responses may be associated with one or more of: a condition of the item, a consumer satisfaction of the item, or an item usage.

According to further examples, the present disclosure describes a reactive tag affixed on an item for obtaining consumer information associated with the item. The reactive tag may include a spectroscopically reactive tag comprising a substrate and a spectral label selectable through the manual action, where the spectral label reacts by generating a modified signal in response to a spectroscopic probe signal; or a manually triggered tag comprising a substrate, a trigger selectable through the manual action, and a reactive label, wherein the reactive label independently changes a physico-chemical state responsive to the selected trigger.

The reactive tag may be integrated with a label. A set of instructions may be provided on the label on how to provide the manual action for selecting one or more of the consumer survey responses via: generating the modified signal in response to the spectroscopic probe signal or changing the physico-chemical state responsive to the selected trigger. The spectral label may generate the modified signal by one or more of: fluorescence, phosphorescence, X-ray fluorescence, magnetization, or magnetic resonance. The spectral label may include one or more of: a fluorophore, a phosphor, a paramagnetic material, a magnetic material, a magneto-optical material, a quantum dot, a transition metal, or a rare earth metal. The spectral label may also include one or more of: a fluorescein, a rhodamine, an eosine, a phloxine, a uranine, a succinein, a saccharein, a rosamine, a rhodol, a pyranine, an anthraquinone, a benzopyran, a thioxanthene, a perylene imide, an acridines, a cyanines, an oxazin, a coumarin, a phenanthridines, a carbopyronin, a green fluorescent protein, or a yellow fluorescent protein. The spectral label may further include a nanoparticulate quantum dot comprising one or more of: cadmium mercury telluride, cadmium selenide, cadmium selenide/zinc sulfide, cadmium sulfide, cadmium telluride, cadmium telluride/cadmium sulfide, lead selenide, lead sulfide, copper indium sulfide, or copper indium sulfide/zinc sulfide.

The manual action may cause the spectral label to be responsive to the spectroscopic probe signal through one or more of: revealing, obscuring, moving, removing, or destroying. The reactive label may independently change to the physico-chemical state in response to the trigger by one or more of: evaporation; condensation; solidification; crystallization; melting; dissolution; precipitation; diffusion; chemical reaction; humidification; change in electrical conductivity; change in optical transmission, absorbance, scattering, or reflection. The reactive tag may further include a physico-chemically reactive material contained in at least one reservoir on the reactive label and a manually triggerable barrier configured to release the physico-chemically reactive material from containment by the reservoir on the reactive label. The manual action may trigger the reactive label by one or more of: exposure to oxygen, exposure to moisture, evaporation, mixing of two or more reactive components, heating, or mechanical disruption.

According to yet other examples, the present disclosure describes a system for obtaining consumer information through a reactive tag. The system may include a tag interrogation module configured to obtain one or more consumer survey responses from an item, where the one or more consumer survey responses are encoded onto the reactive tag affixed to the item such that the responses are selectable through a manual action and the reactive tag is configured to react by: changing a physico-chemical state of the reactive tag, modifying data encoded on the reactive tag, or encoding data on the reactive tag responsive to the manual action. The system may also include a processing module configured to: collect retrieved responses from a plurality of items; generate a report based on the collected responses; and provide the report to a manufacturer or an evaluator.

The reactive tag may be an RFID tag comprising a substrate and circuitry, and be configured to provide at least a portion of the data encoded on the circuitry in response to a reader signal. The RFID tag may also be a passive tag or an active tag. The substrate may comprise a paper, a plastic, or a recyclable material. One or more of the consumer survey responses may be selected by disconnecting a portion of the circuitry in response to a manual action. The portion of the circuitry may be disconnected by breaking extension wiring attached to one or more removable labels on the RFID tag in response to removal of the one or more removable labels as part of the manual action. One or more of the consumer survey responses may be selected by setting one or more memory bits in the circuitry in response to the manual action. Also, the one or more memory bits may be set by disconnecting a connection to a tag supply voltage or a tag ground through extension wiring attached to one or more removable labels on the RFID tag in response to removal of the one or more removable labels as part of the manual action.

The one or more memory bits may be set to 0 or 1. Each consumer survey response may be associated with: a single memory bit or a combination of two or more memory bits. The RFID tag may also be integrated with a label, and a set of instructions may be provided on the label on how to provide the manual action for selecting one or more of the consumer survey responses. The instructions may be provided on the label via one or more of: inkjet printing, gravure printing, flexographic printing, laser printing, or roll-to-roll fabrication. The consumer survey responses may be associated with one or more of: a condition of the item, a consumer satisfaction of the item, or an item usage. The consumer survey responses may be retrieved from the RFID tag by interrogating the RFID tag with an RFID reader. The item may be received at a recycling facility, a waste management facility, a service facility, or a product return facility.

The reactive tag may also be a spectroscopically reactive tag comprising a substrate and a spectral label selectable through the manual action, where the spectral label reacts by generating the modified signal in response to a spectroscopic probe signal; or a manually triggered tag comprising a substrate, a trigger selectable through the manual action, and a reactive label, where the reactive label independently changes to the physico-chemical state responsive to the selected trigger. The spectral label may generate the modified signal by one or more of: fluorescence, phosphorescence, X-ray fluorescence, magnetization, or magnetic resonance. The spectral label may include one or more of: a fluorophore, a phosphor, a paramagnetic material, a magnetic material, a magneto-optical material, a quantum dot, a transition metal, or a rare earth metal. The spectral label may further include one or more of: a fluorescein, a rhodamine, an eosine, a phloxine, a uranine, a succinein, a saccharein, a rosamine, a rhodol, a pyranine, an anthraquinone, a benzopyran, a thioxanthene, a perylene imide, an acridines, a cyanines, an oxazin, a coumarin, a phenanthridines, a carbopyronin, a green fluorescent protein, or a yellow fluorescent protein. The spectral label may also include a nanoparticulate quantum dot comprising one or more of: cadmium mercury telluride, cadmium selenide, cadmium selenide/zinc sulfide, cadmium sulfide, cadmium telluride, cadmium telluride/cadmium sulfide, lead selenide, lead sulfide, copper indium sulfide, or copper indium sulfide/zinc sulfide.

The manual action may cause the spectral label to be responsive to the spectroscopic probe signal through one or more of: revealing, obscuring, moving, removing, or destroying. The reactive label may independently change to the physico-chemical state in response to the trigger by one or more of: evaporation; condensation; solidification; crystallization; melting; dissolution; precipitation; diffusion; chemical reaction; humidification; change in electrical conductivity; change in optical transmission, absorbance, scattering, or reflection. The reactive tag may further include a physico-chemically reactive material in at least one reservoir on the spectral label and a manually triggerable barrier configured to release the physico-chemically reactive material from containment by the reservoir on the spectral label. The manual action may trigger the reactive label by one or more of: exposure to oxygen, exposure to moisture, evaporation, mixing of two or more reactive components, heating, or mechanical disruption.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to obtain consumer information through a reactive tag, the method comprising:
    encoding a two-dimensional matrix code in a series of dots on the reactive tag, wherein each dot of the two-dimensional matrix code is a removable label that corresponds to one or more customer survey responses;
    receiving selection of the one or more customer survey responses through manual actions;
    in response to selection of the one or more customer survey responses, reading the one or more customer survey responses through a machine action;
    receiving a reaction of the reactive tag to the machine action, wherein the reactive tag is configured to perform one of:
        change a physico-chemical state of the reactive tag, and
        encode data on the reactive tag responsive to the manual actions;
    affixing the reactive tag to an item provided to a consumer; and
    retrieving the one or more customer survey responses from the reactive tag through the machine action in response to receiving the item from the consumer.

2. The method of claim 1, further comprising one of:
    selecting the reactive tag through the manual actions, wherein the reactive tag is a spectroscopically reactive tag, and wherein the spectroscopically reactive tag comprises:
        a substrate, and
        a spectral label that reacts by generation of a modified signal in response to a spectroscopic probe signal; and
    selecting the reactive tag through a trigger operable through the manual actions, wherein the reactive tag is a manually triggered reactive tag, and wherein the manually triggered reactive tag comprises:
        another substrate,
        the trigger, and
        a reactive label that independently changes to the physico-chemical state responsive to operation of the trigger through the manual actions.

3. The method of claim 2, wherein the spectral label generates the modified signal by one or more of: fluorescence, phosphorescence, X-ray fluorescence, magnetization, or magnetic resonance.

4. The method of claim 2, wherein the spectral label includes one or more of: a fluorophore, a phosphor, a paramagnetic material, a magnetic material, a magneto-optical material, a quantum dot, a transition metal, or a rare earth metal.

5. The method of claim 2, wherein the spectral label includes one or more of: a fluorescein, a rhodamine, an eosine, a phloxine, a uranine, a succinein, a saccharein, a rosamine, a rhodol, a pyranine, an anthraquinone, a benzopyran, a thioxanthene, a perylene imide, an acridines, a cyanines, an oxazin, a coumarin, a phenanthridines, a carbopyronin, a green fluorescent protein, or a yellow fluorescent protein.

6. The method of claim 2, wherein the spectral label includes a nanoparticulate quantum dot comprising one or more of: cadmium mercury telluride, cadmium selenide, cadmium selenide/zinc sulfide, cadmium sulfide, cadmium telluride, cadmium telluride/cadmium sulfide, lead selenide, lead sulfide, copper indium sulfide, or copper indium sulfide/zinc sulfide.

7. The method of claim 2, wherein the manual action causes the spectral label to be responsive to the spectroscopic probe signal through one or more of: revealing, obscuring, moving, removing, or destroying.

8. The method of claim 2, wherein the reactive label independently changes to the physico-chemical state in response to the trigger by one or more of: evaporation, condensation, solidification, crystallization, melting, dissolution, precipitation, diffusion, chemical reaction, humidification, change in electrical conductivity, change in optical transmission, absorbance, scattering, and reflection.

9. The method of claim 2, further comprising:
providing a physico-chemically reactive material in at least one reservoir on the reactive label; and
providing a manually triggerable barrier configured to release the physico-chemically reactive material from containment by the reservoir on the reactive label.

10. The method of claim 2, wherein the manual action triggers the reactive label by one or more of: exposure to oxygen, exposure to moisture, evaporation, mixing of two or more reactive components, heating, or mechanical disruption.

11. A method to obtain consumer information through a reactive tag, the method comprising:
encoding a two-dimensional matrix code in a series of dots on the reactive tag, wherein each dot of the two-dimensional matrix code is a removable label that corresponds to one or more customer survey responses;
receiving selection of the one or more customer survey responses through manual actions;
in response to selection of the one or more customer survey responses, reading the one or more customer survey responses through a machine action;
receiving a reaction of the reactive tag to the machine action, wherein the reactive tag is configured to perform one of:
change a physico-chemical state of the reactive tag, and encode data on the reactive tag responsive to the manual actions;
affixing the reactive tag to an item provided to a consumer; and
retrieving the one or more customer survey responses from the reactive tag through the machine action in response to receiving the item from the consumer.

12. The method of claim 11, further comprising:
selecting the reactive tag through the manual actions, wherein the reactive tag is a spectroscopically reactive tag, and wherein the spectroscopically reactive tag comprises:
a substrate, and
a spectral label that reacts by generation of a modified signal in response to a spectroscopic probe signal; and
selecting the reactive tag through a trigger operable through the manual actions, wherein the reactive tag is a manually triggered reactive tag, and wherein the manually triggered reactive tag comprises:
another substrate,
the trigger, and
a reactive label that independently changes to the physico-chemical state responsive to operation of the trigger through the manual actions.

13. The method of claim 11, wherein the item is received at a recycling facility, a waste management facility, a service facility, or a product return facility.

14. The method of claim 11, further comprising:
collecting retrieved consumer survey responses from a plurality of items;
generating a report based on the collected consumer survey responses; and
providing the report to one or more of: a manufacturer and an evaluator.

15. A reactive tag affixed on an item to obtain consumer information associated with the item, the reactive tag comprising:
a two-dimensional matrix code that is encoded in a series of dots on the reactive tag, wherein each dot of the two-dimensional matrix code is a removable label that corresponds to one or more customer survey responses;
a spectroscopically reactive tag, the spectroscopically reactive tag comprising:
a substrate selectable through manual actions performed by a consumer; and
a spectral label selectable through the manual actions, wherein the spectral label reacts by generation of a modified signal in response to a spectroscopic probe signal; or
a manually triggered tag, the manually triggered tag comprising:
another substrate,
a trigger selectable through the manual actions, and
a reactive label, wherein the reactive label independently changes a physico-chemical state responsive to the selected trigger.

16. The reactive tag of claim 14, wherein the reactive tag is integrated with a label.

17. The reactive tag of claim 15, wherein a set of instructions are provided on the label on how to provide the manual actions to select the one or more consumer survey responses via one of:
generating the modified signal in response to the spectroscopic probe signal, and
changing the physico-chemical state responsive to the selected trigger.

18. The reactive tag of claim 15, wherein the reactive label independently changes to the physico-chemical state in response to the trigger by one or more of: evaporation, condensation, solidification, crystallization, melting, dissolution, precipitation, diffusion, chemical reaction, humidification, change in electrical conductivity, change in optical transmission, absorbance, scattering, and reflection.

19. The reactive tag of claim 15, wherein the manually triggered tag further comprises:
- a physico-chemically reactive material contained in at least one reservoir on the reactive label; and
- a manually triggerable barrier configured to release the physico-chemically reactive material from containment by the reservoir on the reactive label.

20. The reactive tag of claim 15, wherein the manual actions trigger the reactive label by one or more of: exposure to oxygen, exposure to moisture, evaporation, mixing of two or more reactive components, heating, and mechanical disruption.

* * * * *

UNITED STATES PATENT AND TRADEMARK OFFICE
CERTIFICATE OF CORRECTION

| | | |
|---|---|---|
| PATENT NO. | : 9,147,205 B2 | Page 1 of 1 |
| APPLICATION NO. | : 13/811643 | |
| DATED | : September 29, 2015 | |
| INVENTOR(S) | : Kruglick | |

It is certified that error appears in the above-identified patent and that said Letters Patent is hereby corrected as shown below:

Specification

In Column 1, Line 5, delete "371" and insert -- § 371 --, therefor.

Claims

In Column 24, Line 51, in Claim 16, delete "claim 14," and insert -- claim 15, --, therefor.

Signed and Sealed this
Twenty-second Day of March, 2016

Michelle K. Lee
*Director of the United States Patent and Trademark Office*